United States Patent

[11] 3,604,859

[72] Inventor Itsuki Ban
829, Higashi-Oizumimachi, Nerima-ku,
Tokyo-to, Japan

[21] Appl. No. 789,877
[22] Filed Jan. 8, 1969
[45] Patented Sept. 14, 1971
[32] Priority Feb. 29, 1968
[33] Japan
[31] 43/12573

[54] AUTOMATIC RECORDING LEVEL CONTROL DEVICE FOR MAGNETIC TAPE RECORDER
13 Claims, 12 Drawing Figs.

[52] U.S. Cl. .......... 179/100.2 K, 179/100.1 F, 179/100.1 VC
[51] Int. Cl. .......... G11b 5/44
[50] Field of Search .......... 179/100.1 VC, 100.1 F, 100.2 K; 330/29, 129; 325/401, 415

[56] References Cited

UNITED STATES PATENTS

| | | | |
|---|---|---|---|
| 1,574,807 | 3/1926 | Gannett | 330/129 |
| 2,515,111 | 7/1950 | Buchholzer | 179/100.2 |
| 2,653,282 | 9/1953 | Darling | 330/29 X |
| 2,695,381 | 11/1954 | Darling | 330/29 X |
| 3,046,417 | 7/1962 | Garcia | 330/29 X |
| 3,132,213 | 5/1964 | Taylor | 179/100.1 |

*Primary Examiner*—Stanley M. Urynowicz, Jr.
*Assistant Examiner*—J. Russell Goudeau
*Attorney*—Jacobs & Jacobs

ABSTRACT: This invention relates to an automatic recording level control device for a magnetic tape recorder, comprising a rectifying circuit for obtaining a DC signal to be used for calculating an average value of the recording current in the recording circuit, a detecting circuit which senses the output of said rectifying circuit and creates a variation in the output of the detecting circuit when the sensed output reveals that the recording current has reached an appropriate recording level, a driving means to cause variation in the resistance of a variable resistor for the purpose of controlling the recording level of the recording circuit, and an engaging and stop means which engages with the driving means and stops the movement thereof, depending on the value of the output of the detecting circuit, so that the variation of the variable resistor is stopped at an appropriate position, whereby the recording level of the recorder is automatically controlled to an appropriate value along with the initiation of the recording operation.

INVENTOR
Itsuki Ban
BY Jacobs & Jacobs
ATTORNEY

INVENTOR

Itsuki Ban

BY Jacobs & Jacobs

ATTORNEY

INVENTOR
ITSUKI BAN
BY Jacobs & Jacobs
ATTORNEY

AUTOMATIC RECORDING LEVEL CONTROL DEVICE FOR MAGNETIC TAPE RECORDER

BACKGROUND OF THE INVENTION

This invention relates to an automatic recording level control device to be used for a magnetic tape recorder, and more particularly to the type which is included in the magnetic tape recorder to control automatically the recording level into an appropriate value after the recording operation of the tape recorder is initiated.

Heretofore, when it is desired to record any sound or music on a magnetic tape, it is well known that if an appropriate intensity of the input signal is not furnished to the recording head, no satisfactory result can be obtained because of the creation of an undesirable distortion in the recorded result and/or the accompaniment of deterioration in the S/N ratio. However, the adjustment of the recording level into an appropriate value was not so simple a matter in the practical usage of the tape recorder, and frequent failures were experienced in the past. In order to eliminate the above-described disadvantages, the conventional practices for obtaining an appropriate recording level of the input signal generally consisted or reading the recording current by means of a measuring equipment, or of determining the appropriate recording current from the glow intensity of a neon lamp. Alternatively, a method considered to be more effective in the past utilized a compression circuit consisting of transistors or the like for obtaining an automatic control of the recording current level. In this method, for the purpose of facilitating the recording of an input signal, higher intensity portions of the input signal were compressed and the lower intensity portions thereof were expanded. Although this method could be a solution of the problem for an automatic recording, it was not satisfactory from the view point of the fidelity in the recording, because the flattened feature of the recorded sound was found to be utterly undesirable in the recording of music. If the recorded sound is the more flattened for the reason of the easiness in the recording, the more fatal would be the loss of fidelity at the time the recorded sound is reproduced.

For this reason, the provision of the compressor in the recording circuit was not utterly desirable in such an application where the fidelity of recording is essential, and there was a strong demand for a device whereby the recording level in the magnetic tape recorder could be automatically adjusted into an appropriate value.

SUMMARY OF THE INVENTION

Therefore, the principal object of the present invention is to provide an automatic control device of the recording level to be used in the magnetic tape recorder, wherein the average value of the recording current in the recording circuit is calculated, the output of a detecting circuit is varied corresponding to whether the average value of the recording current reaches a predetermined voltage or it balances with a certain circuit condition, and depending on the variation of the output of the detecting circuit, the resistance variation of a variable resistor to be used for the adjustment of the recording level is stopped, so that the variable resistor is automatically set to an appropriate recording current level.

Another object of this invention is to provide an automatic control device of the recording level to be used in a magnetic tape recorder, wherein the resistance of a variable resistor to adjust the recording level is varied by a driving means consisting of a train of gears and a driving source therefor, the operation of said driving means being interrupted by means of an engageable stopping device operated in response to the output of the above-described detecting circuit, whereby the variable resistor is set to an appropriate recording level.

Still another object of the present invention is to provide a recording level adjusting device to be used in a magnetic tape recorder, wherein the above-described driving source for the driving means is formed into a manually operable rack-pinion combined mechanism, whereby the construction of the driving means is much simplified.

Still another object of the present invention is to provide a recording level control device to be used in a magnetic tape recorder, wherein the above-described driving source for the driving means is formed into a manually rotatable shaft and a spring means which can store energy by the rotation of the shaft, the restoring force of said spring means rotates an operational shaft of the variable resistor whereas the zero setting of the variable resistor is effected at the time the shaft is initially rotated against the resilience of the spring means.

Still another object of the present invention is to provide an automatic recording level control device for the magnetic tape recorder, wherein the variable resistor is rotated in a direction in which the recorded level is heightened, whereby when the recording level is controlled, so-called "fade-in" recording may be obtained.

A further object of the invention is to provide an automatic recording level control device, wherein the variation of the resistor position is effectuated through the rotation of a capstan provided for driving the magnetic tape.

Still further object of the invention is to provide an automatic recording level control device to be used in the magnetic tape recorder, wherein is included an engageable stopping means consisting of an electromagnetic plunger or of a similar electromagnetic device which exerts a frictional force or a magnetic force on the driving means in response to the output of the above-described detecting circuit, whereby the movement of the driving means for the variable resistor is suspended at an appropriate position for obtaining the desired recording level.

Still further objects and the characteristic features of the present invention will be made apparent from the following description when read in conjunction with the accompanying drawings.

DESCRIPTION OF THE PREFERRED EMBODIMENT

Figures 1, 2:
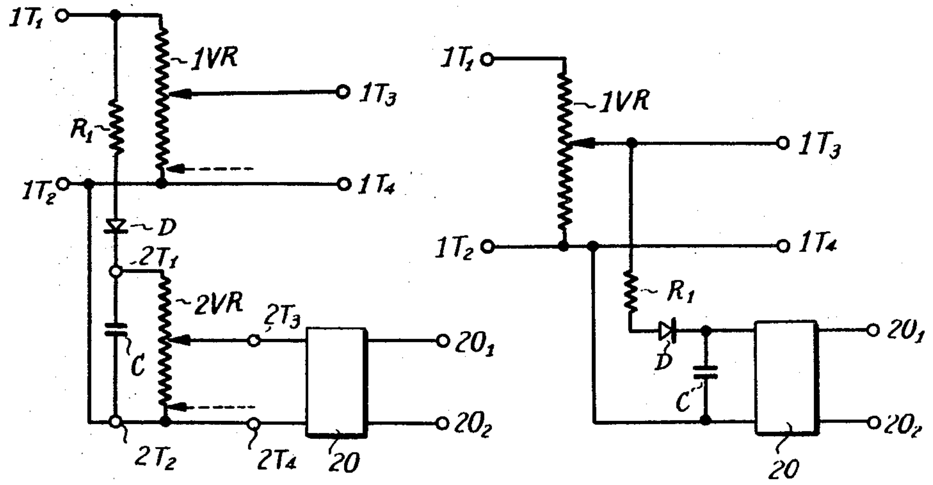
FIG. 1 is a simplified diagram showing a control circuit used in an automatic recording level control device according to the present invention.
FIGS. 2, 3, and 4 are similar diagrams showing various modifications of the control circuit according to the present invention.

Referring at first to FIG. 1 illustrating a control circuit of this invention, there is provided a variable resistor 1VR included in a recording amplifier which amplifies a signal detected, for instance, by a microphone and furnishes an output to a recording head. The input terminals of the variable resistor 1VR are designated by $1T_1$ and $1T_2$, and the output terminals of the resistor 1VR are designated by $1T_3$ and $1T_4$. When an input signal is furnished across the input terminals $1T_1$ and $1T_2$, a variable output is obtained between the output terminals $1T_3$ and $1T_4$ with the adjustment of the variable resistor 1VR. In other words, depending on the intensity of the input signal across the input terminals $1T_1$, $1T_2$, the gain control for the recording amplifier can be obtained by adjusting the variable resistor 1VR, and the recording level in the magnetic tape recorded through the recording head can be adjusted by the variation of the variable resistor 1VR. Another variable resistor 2VR is also provided in the circuit for cooperation with the variable resistor 1VR, one input terminal $2T_1$ of which is connected with the input terminal $1T_1$ through a resistor R1 and a diode D, while the other input terminal $2T_2$ is connected directly to the terminal $1T_2$. Across the terminals $2T_1$ and $2T_2$, there is also connected a capacitor C. With this connection, an average current indicative of the intensity of the input signal applied across the input terminals $1T_1$ and $1T_2$ can be obtained through the rectifying circuit consisting of the diode D and a capacitor C, and this average current is applied across the input terminals $2T_1$, $2T_2$ of the variable resistor 2VR. The output terminals $2T_3$, $2T_4$ of the variable resistor 2VR are connected with a detector circuit 20 consisting of, for instance, a Schmitt circuit. The detector circuit 20 is so constructed that, when it detects the fact of the input voltage being in excess of a predetermined value, an output signal is produced between the output terminals $20_1$, $20_2$, and applied across a coil of an electromagnetic device which stops the movement of the variable resistors 1VR and 2VR.

FIG. 2 illustrates a simplified modification of the control circuit shown in FIG. 1 and the similar parts thereof are designated by the identical reference numerals. In the modification of FIG. 2, only one variable resistor 1VR is employed, and the output from the output terminals $1T_3$, $1T_4$ is rectified by a series connected circuit of a diode D and a capacitor C, and thus obtained average DC current is applied to a detecting circuit 20. In this case, although an advantageous feature of simplifying the circuit may be obtained, some disadvantages also might be accompanied therewith. Since the signal current to be recorded is fluctuating by a considerable amount, this must be transformed as near as possible into DC for the detection of its appropriate recording level. For the fulfillment of this purpose, the capacitance C and the resistance R1 should be considerably large, hence the time constant of about 5 to 10 sec. is required. In the case of the circuit as shown in FIG. 1, because the current flown into the variable resistor 2VR and transformed into a DC value showing the average of the current to be recorded is divided from the resistor 2VR and one part of which is furnished to the detector circuit 20, no harmful effect is seen even if the variable resistor 2VR is varied quickly. However, in the circuit shown in FIG. 2, if the variable resistor 1VR is varied promptly, the rectifying circuit cannot follow such fast variation because of the existence of the time constant due to the resistor R1 and a capacitor C, and the current flown through the detecting circuit 20 cannot follow the actual variation of the input signal. For this reason, it is necessary that the variation of the resistor 1VR is effectuated slow enough in comparison with the time constant due to the R1 and C1, and this feature may constitute a drawback of this type of the circuit when applied in some kind of application.

Figures 3, 4:
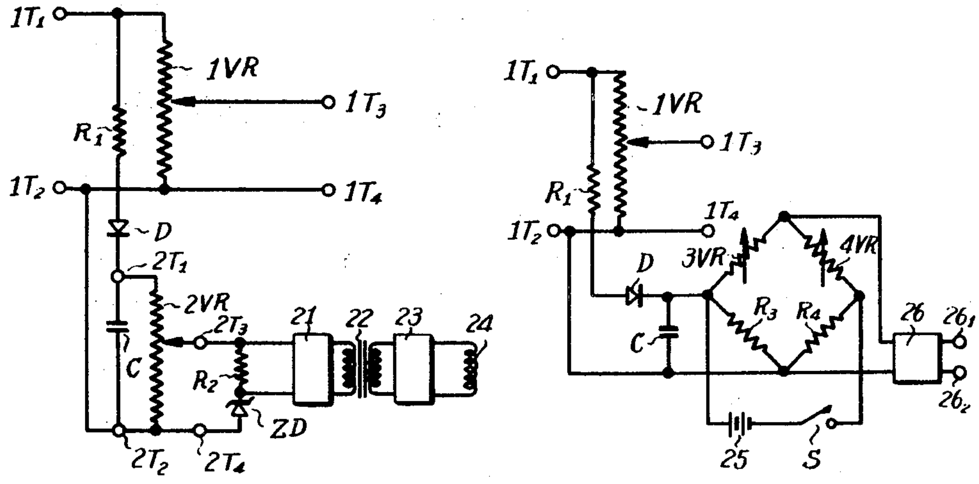

FIG. 3 illustrates another modification of the control circuit wherein the detecting circuit used for determining the recording level is different from the control circuit shown in FIG. 1. In this figure, the similar components are also designated by the same reference numerals as in FIG. 1. In this modification, a series connected resistor R2 and a zener diode ZD are connected across the output terminals $2T_3$ and $2T_4$ of the variable resistor 2VR, and the junction point between the resistor R2 and the zener diode ZD is connected to one of the input terminals of an amplifier 21 and the terminal $2T_3$ is connected to the other of the input terminals. When a signal voltage indicative of the average DC current obtained from the rectifying circuit consists of a diode D and a capacitor C exceeds the zener voltage across the zener diode ZD, a current is flown through the resistor R2, and the voltage created across the resistor R2 is amplified by the amplifier 21. The output of the amplifier 21 is then applied to the primary coil of a transformer 22 connected to the output side of the amplifier 21, and the secondary coil of the transformer 22 is connected with another amplifier 23. The output side of the amplifier 23 is connected with a coil 24, so that at each time when a current is flown through the primary coil of the transformer 22, an impulsive current is furnished from the amplifier 23 to the coil 24. It should be noted that a diode (not shown) is included in the amplifier 23 or a bias voltage in its circuit is adjusted so that an impulsive output voltage pulsating in one polarity is obtained at the input side of the coil 24. The impulse of the voltage is applied to the coil 24 at either of the cases where the signal voltage indicative of the average DC current exceeds the zener voltage or it descends to the lower value than the zener voltage. The operation of the coil 24 will be described hereinafter in more details.

Referring to FIG. 4 which illustrates still another modification of the control circuit shown in FIGS. 1 to 3, the similar parts to those indicated in these drawings are designated by the equivalent reference numerals. The above-described DC current indicative of the average value of the recorded current and obtained through the diode D and the capacitor C is in this case furnished to the input side of a bridge circuit consisting of variable resistors 3VR, 4VR, fixed resistors R3, R4, and a power source 25. The output from the bridge circuit is then furnished to an amplifier 26. A power switch S is provided for energizing the circuit when it is desired. Within the two variable resistors, one of the resistor 3VR is varied interlinkedly or in synchronism with the variable resistor 1VR, and the other variable resistor 4VR is employed for setting the recorded level as desired. In the case when the current flowing into the bridge circuit is higher or lower than the balancing value of the bridge circuit, an unbalance current will be flown across the bridge circuit, and this current is amplified by an amplifier 26 for obtaining the corresponding output at the terminals $26_1$, $26_2$. When the variable resistor 3VR is adjusted, the bridge circuit may be balanced and the output at the terminals $26_1$, $26_2$ is nullified.

In the above description in reference to FIGS. 1 to 4, four examples of the control circuits has been illustrated in which an average value of the recorded current is detected and a variable resistor provided for adjusting the recording level is thereby controlled. The mechanisms to be combined with these control circuits will now be described with reference to FIGS. 5 through 12.

Figure 5:
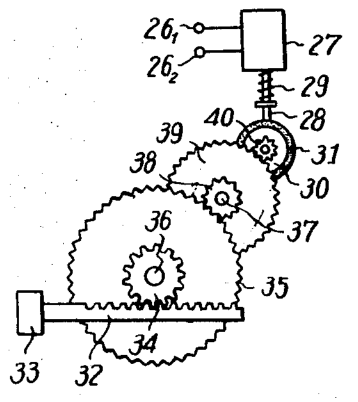
FIG. 5 is a plan view of a mechanism which is combined with the control circuit of FIG. 4 and constitutes an embodiment of the automatic recording level control device according to the present invention.

Referring at first to FIG. 5 which illustrates a mechanism to be combined with the controlling circuit shown in FIG. 4, the output signal from the terminals $26_1$, $26_2$ of the amplifier 26 is applied to an electromagnetic plunger 27. When the bridge circuit in FIG. 4 is at the unbalanced condition and a current is flowing through the plunger 27, a connecting lever 28 of the plunger 27 is attracted upwards against the resilience of a spring 29, and the lower end of the connecting lever or actuator 28 is retracted from the rubber lining 31 on the periphery of a friction wheel 30 freely rotatable around a shaft (not shown). The electromagnetic plunger 27 and the friction wheel constitute the above described engageable stopping means to restrict the variation of the variable resistor. Numeral 32 designates a rack manually slidable in the horizontal direction and engaging with a pinion gear 34, and at one end of the rack 32 is provided a pushbutton 33. With this pinion gear 34 a gear wheel 35 of a larger diameter than the pinion gear 34 is provided integrally so that these two are mounted on a shaft 36. The shaft 36 is coupled with the operating shaft of the duplicated variable resistors 1VR and 3VR (FIG. 4), and the pinion gear 34 and the rack 32 constitute the above described driving source for the variable resistors. Accordingly, if the pushbutton 33 is depressed and the rack 32 is shifted, the pinion gear 34 is rotated, whereby the gear wheel 35 and the operating shaft of the variable resistors 1VR, 3VR is rotated. The rotation of the gear wheel 35 is then transmitted to the gear wheel 38 mounted on a shaft 37, and the rotation of the gear wheel 38 is further transmitted to a gear wheel 40 through another gear wheel 39 which has a larger diameter than the gear wheel 38 and integrally provided on a common shaft 37. When the variable resistor 3VR is varied by depressing the pushbutton and the bridge circuit is brought into the balancing condition, the application of an energizing current to the electromagnetic plunger 27 is interrupted and the operating lever 28 is released to the engagement of the lining 31 of the friction wheel 30 due to the resilience of the spring 29. As a result, the friction wheel 30 is braked, and the movement of the rack 32 is not allowed any more, whereby all the gear train and the variable resistors 1VR, 3VR are brought into the restricted condition.

If all constants of the component elements on the bridge circuit are determined so that the output from the terminals $1T_3$, $1T_4$ is at an appropriate recording level at the time the bridge circuit is brought to the balanced condition by adjusting the variable resistor 3VR, the stopped position of the variable resistor 1VR as a result of the engagement of the connecting lever 28 of the plunger 27 corresponds to the appropriate recording level. That is, with the combination of the circuit of FIG. 4 and the mechanism shown in FIG. 5, the variable resistor 1VR is automatically set to a position where the output from the terminals $1T_3$, $1T_4$ is brought into an appropriate recording level.

When the variable resistors 1VR, 3VR are varied by the depression of the pushbutton 33, two ways of scanning the output voltage from the terminals $1T_3$, $1T_4$ are considered. In the first case, the output of the terminals $1T_3$, $1T_4$ is scanned from the minimum side and in the second case, the same output is scanned from the maximum side. However, in the ordinary case, the output from the terminals $1T_3$ and $1T_4$ is scanned from the minimum side or from the zero recording level and then automatically stopped at the appropriate value. The reason of this is as follows. Because of the existence of the time delay in the rectifying circuit for obtaining the DC average current, it is not possible to depress the pushbutton within a very short period after the input signal is applied. Thus if the output is scanned from the maximum side, the recording must be carried out at a value larger than the appropriate recording level for a certain period, and such a fact is not desirable in the ordinary recording practices. On the contrary, if the output from the terminals $1T_3$, $1T_4$ is scanned from the minimum side, the recording level is gradually increased from its zero level to the appropriate level, and so-called fade-in operation can be obtained. Another variable resistor 4VR is utilized for the purpose of manually adjusting the set position for the desired appropriate recording level.

Figure 6:
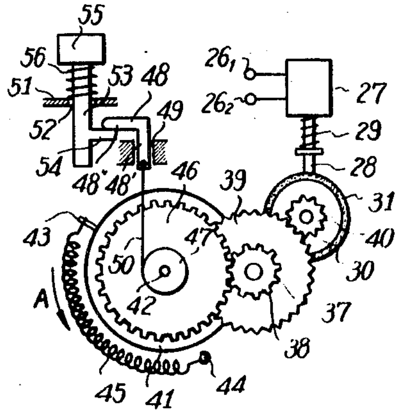
FIG. 6 is a plan view showing another modification of the mechanism shown in FIG. 5.

In the mechanism shown in FIG. 5, the change of the variable resistors 1VR, 3VR is effected by a pressing force of the pushbutton 33, but another embodimental example is shown in FIG. 6 as a convenient means for actual use, in which the source of the rotating drive of the gear train is provided separately.

In FIG. 6, the same numerals are used for the same members as those shown in FIG. 5. The numeral 41 designates a disk, the central portion of which is secured to the operating shaft 42 of the interconnected variable resistors 1VR, 3VR, a projection 43 is provided at a portion of the periphery. A tension spring 45 is inserted between the projection 43 and the pin 44 provided on the stationary portion, and the disk 41 is given with a torque in a direction of the arrow A by the elastic force of said spring 45. The operating shaft 42 is provided with a gear 46 engaging with the gear 38, and further a belt pulley 47 is mounted. The numeral 48 is a lever bent at right angle, an arm 48′ is passed through a guide hole 49, and on the tip end portion of which is connected one end of a steel belt 50 having its other end connected to the belt pulley 47. Another arm 48″ of the lever 48 engages with a projecting portion 54 of a lever 53 inserted through a guide hole 52 formed in a plate 51. On the upper end of the lever 53 is fixed with a pushbutton 55, and a spring 56 is interposed between said pushbutton 55 and the plate 51. Since the elastic force of the spring 56 is larger as compared with that of the spring 45, and the pushbutton 55 is pushed upwardly, in the drawing, by the elastic force of the spring 45, and the gear 46 and the disk 41 are given with a torque in a clockwise direction through the lever 53, projection 54, lever 48, steel belt 50 and the belt pulley 47, so that the spring 45 is placed under an energized state.

When the pushbutton 55 is pressed against the elastic force of the spring 56 for automatically establishing a recording level, the engagement between the levers 53 and 48 is released, and the disk 41 rotates by a restoring force of the spring 45. The rotation is effected at a predetermined, restricted speed by a governing action of the gear train of the gear wheels 46, 38, 39 and 40. With the rotation of the disk 41, the operating shaft 42 of the variable resistors is rotated, and the engagement by the electromagnetic plunger 27 is effected at an appropriate level according to the aforesaid theory, and the rotation of the operating shaft stops. The state of the variable resistor 1VR at this moment is a state in which the terminals $1T_3$, $1T_4$ are caused to produce signals of the appropriate recording level. The source switch S shown in FIG. 4 is required to be closed only during the setting operation of the recording level, so that the opening and closing of the switch S is preferably interconnected with the operation of the pushbutton 55. A further favorable effect can be obtained when the pushbutton 55 is used also as the pushbutton for starting the recording of the tape recorder.

In FIG. 5 and 6, it is also possible to use a small-sized electromagnetic clutch instead of the electromagnetic plunger 27, to rotate the operating shaft of the variable resistor by means of small electric motor, and to interrupt the driving current of the motor by a detective current of appropriate recording levels.

Figures 7, 8:
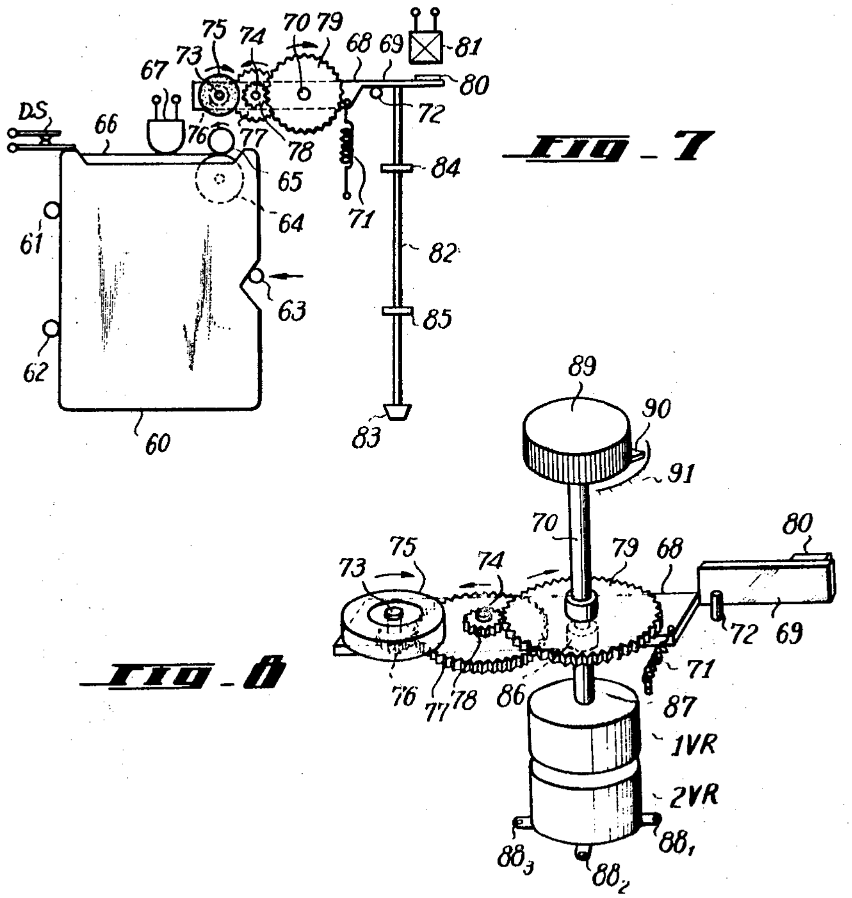
FIG. 7 is a plan view of still another modification of the mechanism which can be combined with the control circuit of FIG. 1 and constitutes another embodiment of the automatic recording level control device according to the present invention.
FIG. 8 is an enlarged perspective view showing the relation between the gear train employed in the mechanism of FIG. 7 and the variable resistor of FIG. 1.

FIGS. 7 and 8 show an example of a mechanism for automatically establishing a recording level combined with the circuit shown in said FIG. 1, particularly for the case in which automatic recording is effected using an endless-tape cartridge.

The endless-tape cartridge 60 is mounted on a deck (not shown) by means of guides 61, 62, 63 provided on the deck as shown in the drawings, a pinch roller 64 housed internally bears against the capstan 65 causing the magnetic tape 66 to run. The magnetic head 67 can record a required item on the magnetic tape 66 by sliding contact therebetween. A guide 63 is urged elastically in a direction of arrow, and abutted against the inclined surface of lateral recess of cartridge, to settle the cartridge into the position, and at the same time giving the pinch roller 64 and the capstan 65 a pressing force. The numeral 68 designates a swing lever having a leaf spring 69 at one end, and is supported freely swingable around a rotating shaft 70, and is urged in the clockwise direction by a spring 71, but the swinging is blocked by a stopper pin 72. On the swing lever 68 are rotatably mounted shafts 73, 74, and on the shaft 73 is mounted a frictional rubber wheel 75 and a gear 76, on the shaft 74, gears 77, 78, respectively. The gear 76 engages with gear 77, and the gear 78 engages with a gear 79 mounted on the rotating shaft 70. Thus, the rotation of the frictional rubber wheel 75 is transmitted to the rotating shaft 70 through said reduction gearing. A magnetic piece 80 is fixed on the right-hand side of the leaf spring 69, and on the deck is secured an electromagnetic device 81 having a magnetic path with the open end facing against said magnetic piece 80. On the side surface of the leaf spring 69 is abutted the tip end of an elongated rod 82 provided with a pushbutton 83 at one end and supported slidably by means of guides 84, 85.

FIG. 8 is an enlarged perspective view of the swing lever 68 and the equipments, and the operating shaft 87 of the variable resistors 1VR, 2VR (FIG. 1) is connected with the lower end of the rotating shaft 70 through a coupling 86, and the variable resistors 1VR, 2VR are fixed on the body member through mounting pieces $88_1$, $88_2$, $88_3$ provided on one portion of each resistor.

With the rotation of the swing lever 68, since the capstan 65 is provided in the area of swinging of the frictional rubber wheel 75 which rotates with the swing lever 68, when a push-button 83 is pressed and the swing lever 68 is swung against the elastic force of the spring 71, the frictional rubber wheel 75 rotates abutting on the capstan 65. Since the rotation of the frictional rubber wheel 75 is transmitted to the rotating shaft 70 through the reduction gear, the operating shaft 87 of the variable resistors 1VR, 2VR rotates, changing the variable resistors 1VR, 2VR, respectively. Thus a mechanism is constituted as a driving source of rotation for the gear train by means of capstan 65 and the frictional rubber wheel 75.

A knob 89 provided at the tip end of the rotating shaft 70 is exposed beyond the outer surface of the body, and a pointer 90 thereof confronting with an indicating dial 91 provided on the surface of the body. When the frictional rubber wheel 75 is not abutted with the capstan 65, that is, the establishment of the recording level is not carried out, the variable resistors 1VR, 2VR are controlled by rotating the knob 89 manually, and the recording level is established freely.

Figure 9:
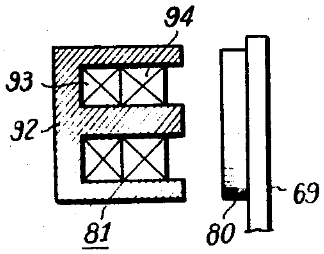
FIG. 9 is a plan view, partly in section, showing the details of an electromagnetic device employed in the mechanism of FIG. 7.
Figure 10:
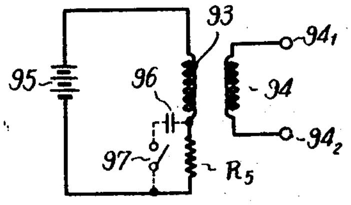
FIG. 10 is a circuit diagram showing the connection of a coil included in the electromagnetic device of FIG. 9.

Now, the magnetic piece 80 and the electromagnetic device 81 which constitute the stopping device will be described in detail referring to FIG. 9 and FIG. 10. The electromagnetic device 81 is constituted by a pot-type core 92 in which two sets of the first and the second sets of coils 93, 94 are included, said coils 93, 94 having an electrical wiring as shown in FIG. 10. Namely, the first coil 93 is connected to a source 95 through a resistor $R_5$ and is supplied with a relatively weak current. The second coil 94 is connected to the output terminals $20_1$, $20_2$ of the detecting circuit 20 in FIG. 1 through the terminals $94_1$, $94_2$. The intensity of the magnetic flux produced in the first coil 93 is so adapted that it can attract intensely with said magnetic piece 80 when the open end of the magnetic circuit of the core 91 is closed by the magnetic piece 80, but it cannot attract the magnetic piece 80 when the magnetic piece 80 is away from the core 91. On the other hand, the direction of current flowing in the second coil 94 is such that it eliminates the magnetic flux generated in the first coil 93, so that when the magnetic piece 80 is attracted by the core 92, the output current from the detecting circuit 20 flows in the second coil 94, the attraction of the magnetic piece 80 is released.

Next, a general function of the mechanism shown in FIGS. 7 and 8 will be described. When an endless tape cartridge 60 is mounted on the deck, the door switch DS is closed by the front edge of said cartridge, a motor (not shown), as a driving source of the capstan 65, is fed, and the capstan 65 begins to rotate. Then when the pushbutton 83 is pressed, the swing lever 68 is swung against the elastic force of the spring 71, the frictional rubber wheel 75 is urged on the capstan 65, ad the magnetic piece 80 is attracted to the electromagnetic device 81. Therefore, the swing lever 68 is engaged at a position where the frictional rubber wheel 75 is contacted with the capstan 65 even after the pushbutton 83 is released. The frictional rubber wheel 75 rotates with the abutting of the capstan 65 and the rotating shaft 70 rotates through the reduction gear train 76, 77, 78 and 79. In this manner if the variable resistors 1VR, 2VR are set at zero level by rotating the knob 89 manually (so that the terminals 1T3, 2T3 come to the positions shown by dotted lines in FIG. 1), the variable resistors 1VR, 2VR will change with the rotation of the rotating shaft 70 the recording level will rise gradually and will be caused to produce a so-called "fade in." When the recording level reaches an appropriate value, an output voltage is generated between the output terminals $20_1$, $20_2$ of the detecting circuit 20 as described above, and the said output voltage is applied on the second coil 94 of the electromagnetic device 81. Therefore, a current flows in the second coil 94, a magnetic flux is produced from the second coil. The flux generated from the first coil 93 is cancelled by this flux, the attractive engagement of the magnetic piece 80 by the electromagnetic device 81 is released, and the swing lever 68 is restored by the elastic force of the spring 71. With the restoration of the swing lever 68, the frictional rubber wheel 75 retracts from the capstan 65, the variation of the variable resistors 1VR, 2VR ceases, and after which the variable resistor 1VR is set at a position of an appropriate recording level. As is evident from the above operation, an apparatus may be obtained which can record automatically at an appropriate recording level by combining the mechanism shown in FIGS. 7, 8 and the circuit shown in FIG. 1. In the case where a stereo recording is to be effected, the number of variable resistor 1VR is necessarily increased by one. In the case where the mechanism shown in FIGS. 7 and 8 is to be used in combination with the circuit shown in FIG. 2, it is clear that the variable resistor 2VR in FIG. 8 is not used or it is omitted.

With the mechanism shown in FIGS. 7 and 8, the first swing of the swing lever 68 can be effected by the pushbutton 83, but the swing lever 68 can be actuated, with the mounting of the cartridge 60, by connecting a series circuit of the capacitor 96 and the switch 97 with the resistor $R_5$ in FIG. 10 in parallel as shown by a dotted line, and by causing said switch 97 to open and close with the door switch DS interconnected thereto. That is, when the switch 97 is closed simultaneously with the mounting of the cartridge 60, a heavy current flows pulsatingly in the coil 93 through the capacitor 96, a large flux generates from the coil 93, and the magnetic piece 80 is attracted by the electromagnetic device 81 against the elastic force of the spring 71. After which the magnetic piece 80 is maintained in a state of being attracted by and engaged with the electromagnetic device 81 by means of relatively weak current flowing through the resistor $R_5$. Thus, it is possible to eliminate the long rod 82 and the pushbutton 83 by providing the capacitor 96 and the switch 97.

The above-mentioned electromagnetic device 81 is so constructed that, in order to release the attractive engagement of the magnetic piece 80, the second coil 94 is fed with a current for cancelling the flux generated from the first coil 93; but by interposing a switching transistor (not shown) between the first coil 93 and the power source 95, and by effecting the base control of said switching transistor with the output signal of the detecting circuit 20 and by interrupting the current flowing in the coil 93 by putting the switching transistor under a nonconductive state, the attractive engagement of the magnetic piece 80 is released, and the coil 94 may be eliminated.

Figure 11:
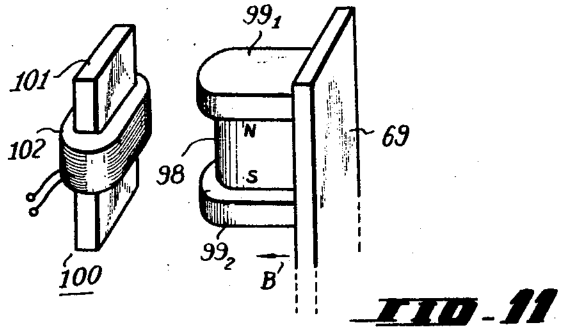
FIG. 11 is a perspective view of another embodiment of the electromagnetic device illustrated in FIG. 7.

In case where the mechanism shown in FIGS. 7 and 8 is used in combination with the circuit shown n FIGS. 1 or 2, it is necessary to set previously the variable resistors 1VR, 2VR at zero level before starting recording, but when said mechanism is used in combination with the circuit shown in FIG. 3, no such setting is needed. Furthermore, in this case, the variable resistors 1VR, 2VR to be used are such that their operating shafts can be rotated for any desired turns in one direction, or the rotating shaft 70 is adapted to swing for a predetermined angle reciprocatingly by the rotation of the frictional rubber wheel 75 in one direction through an addition of a gear mechanism, which is different from the gear train shown in the drawing, between the frictional rubber wheel 75 and the rotating shaft 70. Being thus constituted, when the frictional rubber wheel 75 begins to rotate by pressing the pushbutton 83, the variable resistor 1VR, 2VR change continuously, and the voltage at the output side changes through one cycle between the minimum and maximum values. Therefore, in the circuit shown in FIG. 3, during said cycle, an appropriate recording level is surely obtained and the pulse output is applied on the coil 24. Assuming the coil 24 is the second coil 94 of the electromagnetic device 81, the frictional rubber wheel 75 leaves from the capstan 65 at the appropriate recording level, and the rotation is stopped. In this manner the recording may be effected at the appropriate recording level thereafter. In this example, there is a disadvantage that a fade-in recording cannot be effected although no zero level setting of the variable resistors is required. Also in this case at times, the recording level is too high, at the beginning of recording, so that it is necessary to control the initial recording current utilizing, for example, the charging current of a capacitor (not shown). FIG. 11 shows a mechanism for attractively engaging the swing lever 68 by the magnetic force of a permanent magnet instead of using the electromagnetic device 81 and magnetic piece 80. Namely, on the leaf spring 69 attached to the swing lever 68, there are fixed a permanent magnet 98 magnetized into N pole and S pole and the yokes $99_1$, $99_2$ thereof, and opposed therewith an electromagnetic coil 99 wound with a coil 102 on soft steel plate 101 is fixed on the body. The yokes $99_1$, $99_2$ of the permanent magnet 98 approached in a direction of arrow B are closed its magnetic circuit by soft steel plate 101 and are attracted and engaged thereto. When an output from the terminals $20_1$, $20_2$ shown in FIG. 1 is applied on the coil 102, since the magnetic flux produced from the coil 102 has a direction cancelling the magnetic flux due to the permanent magnet 98, the magnetic attraction between the yokes $99_1$, $99_2$ and the soft steel plate 101 is released. By using the mechanism shown in FIG. 11, there is an advantage that no current is consumed for stopping the swing lever 68 during the time in which the stopping of the swing lever is effected, that is, during recording.

Figure 12:
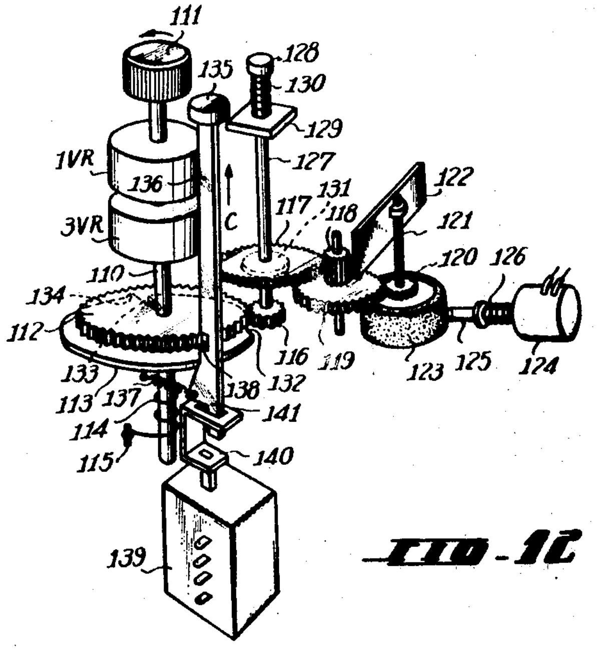
FIG. 12 is a perspective view of still another modification of the mechanism which may be combined with the control circuit of FIG. 1 for obtaining still another embodiment of the automatic recording level control device according to the present invention.

FIG. 12 shows another example of mechanism by means of which automatic recording level is established in combination with the circuit shown in FIG. 4.

In this drawing, the numeral 110 shows the rotating shaft used as an operating shaft of the variable resistors 1VR, 3VR in FIG. 4. With the rotation of said rotating shaft, the variable resistors 1VR, 3VR are changed. On the upper end of the rotating shaft 110, there is provided a knob 111, and at the lower end thereof, a gear 112 and a controlling plate 113 are secured. A spring 114 is wound around the rotating shaft 110 with one end of the spring fixed at a portion of said shaft and with the other end on a pin 115 secured on the body. When the knob 111 is rotated manually in a direction shown by the arrow in the drawing, said spring 114 is wound up producing a restoring elasticity and giving the rotating shaft 110 a torque. In this drawing the bearing of the rotating shaft 110 is omitted. The torque of the rotating shaft 110 by the spring 114 is transmitted to a rotating shaft 121 through a gear train consisting of gears 112, 116, 117, 118, 119 and 120. On the rotating shaft 121, there are fixed a fly 122 and a rubber wheel 123. The fly 122 serves as a governor. On the side of the rubber wheel 123, an actuator 125 for an electromagnetic plunger 124 is urged by a compressive elasticity of a spring 126, and by means of which the rotation of the rubber wheel 123 is stopped. The current flowing through the electromagnetic plunger 124 is controlled by the output of the amplifier 26 shown in FIG. 4, when a current is passed therethrough, the actuator 125 is attracted against the elastic force of the spring 126 and is removed from the rubber wheel 123, so that the rubber wheel 123 can move freely.

On the upper end of the rotating shaft 127 of the gears 116 and 117, there is provided a pushbutton 128, and a compression spring 130 is inserted between said pushbutton 128 and the bearing 129. The gear 116 is fixed on the rotating shaft 127 directly, but the gear 117 is connected through a known reverse check mechanism, using for example a ratchet shown by numeral 131. It follows that when the spring 114 is wound up by rotating the knob 111 in a direction of the arrow, the rotating shaft 127 turns idle; and when the rotating shaft 110 is rotated by the returning force of the spring 114, the rotation of the rotating shaft 127 is transmitted up to the rubber wheel 123. Said control plate 113 has a shape of a circular disk having a diameter larger than that of the gear 112, and on one part of the periphery, a cutout 132 for passing through of the gear 116 when the latter is lowered as will be described later, and on the other part of the periphery, a cutout 133 and a projection 134 are provided. A pushbutton 135 and a pushbutton rod 136 are supported for vertical movement and urged in a direction of arrow C by means of spring which is not shown. Between the pushbutton rod 136 and the body a tension spring 137 is provided, and the pushbutton rod 136 is lightly pressed against the periphery of the control plate 113 by means of the elastic force of said spring 137. The pushbutton rod 136 is formed with a cutout 138 at a portion of the periphery abutting with the control plate 113, and the lower end is loosely inserted in an elongated hole 141 formed in the actuator 140 of a changeover switch 139 provided on the body. The changeover switch 139 serves to switch the recording and regenerating, and this switch is not necessary of course if the device is used only for recording. The changeover switch 139 is so constructed that when the actuator 140 is pressed upwardly, the changeover switch 139 is switched to the recording, and when the pressing is stopped, it returns by the return spring, which is included therein, and is placed under a regenerating state. When the pushbutton 135 is pressed downwardly, the actuator 140 of the changeover switch 139 is pressed and is switched to the recording, and at the same time the lower end of the pushbutton rod 136 slides within the elongated hole 141 the cutout 138 engages with the peripheral portion of the control plate 113 by the elastic force of the spring 137, and the changeover switch 139 is engaged in a recording state. In order to switch into a regenerating state, the knob 111 is turned considerably in a direction of arrow, and causing to match the cutout 133 and the cutout 138 of the pushbutton rod 136 against some resistance due to the projection 134 of the control plate 113. Then the pushbutton rod 136 restores upwardly, and the changeover switch 139 also restores, thus the regenerating state is obtained.

Now, the operation for establishing automatic recording level setting will be described. First, the knob 111 is turned considerably in a direction of arrows so as to wind up the spring 114. With the turning of the knob 111, the cutout 133 of the control plate 113 coincides with the pushbutton rod 136, the pushbutton rod 136 penetrates into the cutout 133 by the spring 137, and the turning of the control plate 113 and the various mechanisms connected thereto are stopped. At this moment, the outputs from the variable resistors 1VR, 3VR are set to become zero. Next, by pushing the pushbutton 135, the changeover switch 139 is switched to recording, and at the same time the cutout 138 of the pushbutton rod 136 descends and coincides with the cutout 133, so that the engagement of the control plate 113 by the pushbutton rod 136 is released. Thus, the outputs of the variable resistors 1VR, 3VR begin to change towards increase by the returning force of the spring 114 while subjected to a governor action. As explained referring to FIG. 4, when the appropriate recording level is attained, the output of the amplifier 26 becomes zero, the current in the electromagnetic plunger 124 is interrupted, and the actuator 125 presses and stops the rubber wheel 123. Accordingly the change of the variable resistors 1VR, 3VR stops automatically at an appropriate recording level, and the automatic recording level is established. When the establishment of the recording level is finished, the electromagnetic plunger 124 will not operate even with the fluctuation in the intensity of recording signals by the time constant of the circuit shown in FIG. 4 and the operating characteristics of the electromagnetic plunger 124, and no change occurs in the established recording level during the recording period.

Now the operation for free manual establishment of a recording level will be described. When the pushbutton 128 is pressed against the elastic force of the spring 130, and the gear 116 is passed downwardly through the cutout 132 of the control plate 113, the engagement of gear 116 with the gear 112 is released, the knob 111 can freely be rotated manually. In this state, when the knob 111 is rotated a little, a portion of the gear 116 is positioned at the rear surface of the control plate 113, then by releasing the pressing of the pushbutton 128, the gear 116 abuts the control plate 113 and the restoring by the spring 130 is prevented. Thus the engagement of gear 116 and gear 112 is remained released and the variable resistors 1VR, 3VR can be rotated freely by the knob 111. Namely, the recording level can be established freely. It is to be noted, however, the elastic force of the spring 114 should then be suppressed by a frictional force between the control plate 113 and the gear 116. Therefore, it is necessary to determine appropriately the strength of the spring 114 and spring 130 and the frictional braking force between the control plate 113 and the upper surface of the gear 116. The projection 134 on the control plate 113 serves to prevent the cutouts 133 and 138 from being coincided and being put under a regenerating state inadvertently caused by turning the variable resistors 1VR, 3VR too much during adjustment of a recording level.

The method of combining the rubber wheel 123 and the electromagnetic plunger 124 may be effected by any suitable means. For example, a small electromagnetic clutch may be used, or the periphery of the gear can be pressed or abutted by electromagnetic plunger.

The recording level automatic setting device according to the present invention has just been described above, but it will be understood that the present invention is not limited to the example shown in the drawings, but various changes and modifications will be made without departing from the true spirit and scope of the present invention as defined by the appended claims.

1. A recording level automatic control device for magnetic tape recorders comprising a recording circuit including a variable resistor for regulating the recording level, a driving means for varying the variable resistor of said recording circuit, a rectifying circuit for producing a DC signal proportional to the average value of the recording current in the recording circuit, a detecting circuit responsive to said DC signal for producing an output signal indicating that the recording current of said recording circuit has become adapted for an appropriate recording, and a stop means responsive to said output signal for stopping said driving means to thereby stop the change of the variable resistor.

2. A recording level automatic control device as claimed in claim 1, wherein said rectifying circuit is adapted to rectify the recording current flowing into the variable resistor of said recording circuit, and said detecting circuit is constituted by a bridge circuit, one resistor element of said bridge circuit being consisted of another variable resistor adapted to change by means of said driving means in synchronism with the variable resistor of said recording circuit.

3. A recording level automatic control device as claimed in claim 1 wherein said rectifying circuit comprises a Zener diode at the output side, said DC signal being applied to said detecting circuit when the voltage applied to said Zener diode exceeds the Zener voltage.

4. A recording level automatic control device as claimed in claim 1, wherein said driving means is comprised of a gear train and a source for driving the gear train, one rotating shaft of said gear train being connected to the operating shaft of the variable resistor of said recording circuit.

5. A recording level automatic control device as claimed in claim 4, wherein said stop means comprises an electromagnetic plunger operable in response to the output of said detecting circuit, and a friction wheel provided on one of the gears of said gear train and disposed against said electromagnetic plunger, the rotation of gear train being stopped by engagement of the actuator of the electromagnetic plunger with the friction wheel when the electromagnetic plunger is not operated.

6. A recording level automatic control device as claimed in claim 5, wherein the rotating and driving source of said driving means comprises a manually slidable rack, and a pinion gear engaged with said rack and connected with said gear train, the variable resistor being changed in a direction in which the recording level of said recording circuit is increased by pushing of the rack, whereby a fade-in recording is made possible.

7. A recording level automatic control device as claimed in claim 5, wherein the rotating and driving source of said driving means comprises a rotating shaft provided with one gear of the gear train of said driving means, a spring energized by manual rotation of said rotating shaft, and a lever member stopping the rotation of the rotating shaft against the elastic force of said spring, the rotating shaft being rotated by the restoring force of the spring by releasing the rotating engagement of the rotating shaft through manual operation of the lever member.

8. A recording level automatic control device as claimed in claim 7, wherein the variable resistor is provided on the same rotating shaft of said rotating and driving source, the variable resistor being adapted to be set at zero by the rotation of the rotating shaft when energizing said spring, the variable resistor being adapted to change in a direction to increase the recording level of said recording circuit at the control of recording level, whereby a fade-in recording is made possible.

9. A recording level automatic control device for magnetic tape recorders comprising a recording circuit including a variable resistor for regulating the recording level, a driving means for varying the variable resistor of said recording circuit including a gear train, one rotating shaft of said gear train being connected to the operating shaft of the variable resistor of said recording circuit, a rectifying circuit for producing a DC signal proportional to the average value of the recording current in the recording circuit, a detecting circuit responsive to said DC signal for producing an output signal indicating that the recording current of said recording circuit has become adapted for an appropriate recording, and a stop means responsive to said output signal for stopping said driving means to thereby stop the change of the variable resistor, and wherein said stop means comprises an electromagnetic device provided with a coil to which the output current of said detecting circuit is applied, and a magnetic piece adapted to be magnetically attracted to said electromagnetic device; a rotating and driving source for said gear train comprising a capstan for running and driving the magnetic tape, and a frictional rubber wheel adapted to rotate in abutment with said capstan; said frictional rubber wheel and said gear train being connected with each other and each being mounted on a rotatably supported swing lever, a spring provided on said swing lever to keep the frictional rubber wheel away from the capstan, the swing lever being adapted to be rotated against the bias of said spring by the magnetic attraction of said magnetic piece by the electromagnetic device so that the pressing contact between the capstan and the frictional rubber wheel is obtained and the variable resistor is changed and the swing lever is adapted to be restored by the bias of said spring when there is no magnetic attraction between the electromagnetic device and the magnetic piece, said electromagnetic device being responsive to the output of said detecting circuit to release said magnetic attraction, whereby the change of the variable resistor is stopped.

10. A recording level automatic control device as claimed in claim 9, wherein the electromagnetic device of said stop means is comprised of a first coil through which a weak current normally flows, a second coil through which a current is caused to flow in response to the output of said detecting circuit, and a core wound with the first and the second coils having magnetically open ends, and a lever member is provided for swinging and operating said swing lever against the bias of the spring, said magnetic piece being arranged to close the magnetically open ends of said core by the swinging of the swing lever operated by said lever member and to be attracted and held on the core by a magnetic flux produced by said first coil, said coils being so arranged that the magnetic flux of the first coil is cancelled by the magnetic flux produced by said second coil, whereby the attraction of the core and the magnetic piece is released.

11. A recording level automatic control device as claimed in claim 9, wherein the magnetic piece of said stop means is made of a permanent magnet, and said electromagnetic device is comprised of soft steel plates and a coil wound on said steel plate in such a manner that current flowing in said coil cancels the magnetic flux of the permanent magnet to eliminate the attractive force between the permanent magnet and the soft steel plates.

12. A recording level automatic control device as claimed in claim 9, wherein a knob is provided on a shaft of said gear train, said knob being adapted to be operated manually when the capstan and the frictional rubber wheel are not pressed and contacted, whereby when the variable resistor is set at zero prior to the automatic control of the recording level fade-in recording is made possible.

13. A recording level automatic control device as claimed in claim 9, wherein the magnetic piece of said stop means is provided on the swing lever through a spring plate, said swing lever being biased by said spring plate to exert a pressing and contacting force between the capstan and the frictional rubber wheel.